(12) United States Patent
Köhnke

(10) Patent No.: US 11,222,128 B2
(45) Date of Patent: Jan. 11, 2022

(54) METHOD FOR MANAGING COLLECTED TRANSPORTATION VEHICLE DATA

(71) Applicant: VOLKSWAGEN AKTIENGESELLSCHAFT, Wolfsburg (DE)

(72) Inventor: Axel Köhnke, Dülmen (DE)

(73) Assignee: Volkswagen Aktiengesellschaft

(*) Notice: Subject to any disclaimer, the term of this patent is extended or adjusted under 35 U.S.C. 154(b) by 161 days.

(21) Appl. No.: 16/087,695

(22) PCT Filed: Feb. 13, 2017

(86) PCT No.: PCT/EP2017/053128
§ 371 (c)(1),
(2) Date: Sep. 24, 2018

(87) PCT Pub. No.: WO2017/162366
PCT Pub. Date: Sep. 28, 2017

(65) Prior Publication Data
US 2019/0108356 A1    Apr. 11, 2019

(30) Foreign Application Priority Data
Mar. 24, 2016 (DE) .................... 10 2016 205 002.8

(51) Int. Cl.
*G06F 21/62* (2013.01)
*G06F 21/60* (2013.01)
(Continued)

(52) U.S. Cl.
CPC .......... *G06F 21/6218* (2013.01); *G06F 16/25* (2019.01); *G06F 21/604* (2013.01);
(Continued)

(58) Field of Classification Search
CPC .... G06F 21/6218; G06F 21/25; G06F 21/604; G06F 21/62; H04L 63/102; G07C 5/085
See application file for complete search history.

(56) References Cited

U.S. PATENT DOCUMENTS 6,711,495 B1    3/2004 Ukai et al.
2004/0128378 A1    7/2004 Blakley, III et al.
(Continued)

FOREIGN PATENT DOCUMENTS

CN    102959589 A    3/2013
CN    104219310 A    12/2014

OTHER PUBLICATIONS

Search Report for German Patent Application No. 10 2016 205 002.8; dated Dec. 8, 2016.
(Continued)

*Primary Examiner* — Ashokkumar B Patel
*Assistant Examiner* — William B Jones
(74) *Attorney, Agent, or Firm* — Barnes & Thornburg LLP

(57) ABSTRACT

A method for managing collected transportation vehicle data relating to a transportation vehicle in a database. The transportation vehicle data are stored in the database together with information relating to a permissible use of the transportation vehicle data. The database allows access to the transportation vehicle data only according to the information relating to the permissible use. The method includes receiving information relating to a desired use of the transportation vehicle data and updating the information relating to the permissible use of the transportation vehicle data according to the information relating to the desired use of the transportation vehicle data.

17 Claims, 3 Drawing Sheets

(51) Int. Cl.
    *H04L 29/06*         (2006.01)
    *G06F 16/25*         (2019.01)
    *G07C 5/08*          (2006.01)

(52) U.S. Cl.
    CPC ............. *G06F 21/62* (2013.01); *G07C 5/085* (2013.01); *H04L 63/102* (2013.01)

(56) References Cited

U.S. PATENT DOCUMENTS

| | | |
|---|---|---|
| 2005/0229233 A1 | 10/2005 | Zimmerman et al. |
| 2013/0117857 A1 | 5/2013 | Zimmerman |
| 2013/0124009 A1* | 5/2013 | Esler .................. B60W 50/085 701/2 |
| 2013/0194301 A1 | 8/2013 | Robbins et al. |
| 2015/0074819 A1 | 3/2015 | Borenstein |
| 2015/0112736 A1* | 4/2015 | Chan .................. G06Q 30/0645 705/5 |
| 2015/0135336 A1* | 5/2015 | Arasavelli ................ H04B 7/26 726/29 |
| 2016/0216955 A1* | 7/2016 | Kwon ........................ G06F 8/63 |
| 2018/0091608 A1* | 3/2018 | Camacho .............. H04W 12/08 |
| 2020/0111143 A1* | 4/2020 | Gormley ............. B60R 16/0373 |

OTHER PUBLICATIONS

Search Report for International Patent Application No. PCT/EP2017/053128; dated Apr. 20, 2017.

* cited by examiner

METHOD FOR MANAGING COLLECTED TRANSPORTATION VEHICLE DATA

PRIORITY CLAIM

This patent application is a U.S. National Phase of International Patent Application No. PCT/EP2017/053128, filed 13 Feb. 2017, which claims priority to German Patent Application No. 10 2016 205 002.8, filed 24 Mar. 2016, the disclosures of which are incorporated herein by reference in their entireties.

SUMMARY

Illustrative embodiment relate to the monitoring and tracking of collected transportation vehicle data. In particular, illustrative embodiments relate to a method for managing collected transportation vehicle data relating to a transportation vehicle in a database.

BRIEF DESCRIPTION OF THE DRAWINGS

Exemplary embodiments are explained in more detail below with reference to the accompanying figures, in which.

DETAILED DESCRIPTION

Figure 1:
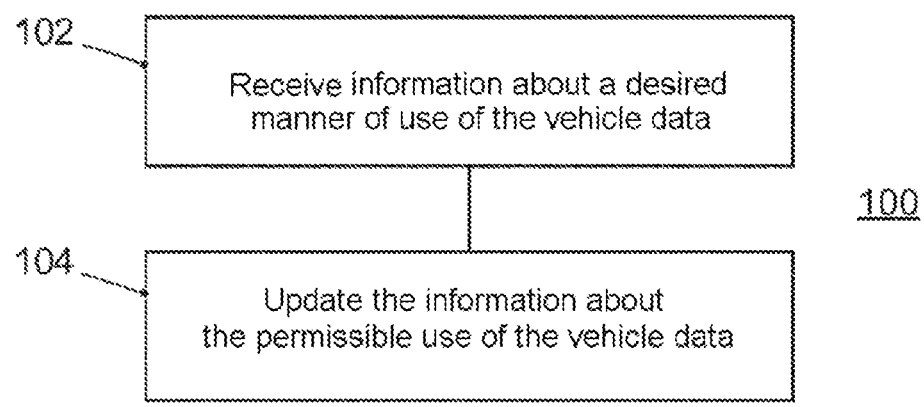
FIG. 1 shows a flowchart for an exemplary embodiment of a method for managing collected transportation vehicle data relating to a transportation vehicle in a database.

Transportation vehicles increasingly collect data that may be both user-specific and user-unspecific. The transportation vehicle may be either a passenger transportation vehicle or a commercial transportation vehicle. For example, a transportation vehicle may be a motor car, a truck, a motor cycle or a tractor. Generally, a transportation vehicle can be regarded as an apparatus comprising an engine, a drivetrain system and wheels. Ordinarily, the collected data are stored outside the transportation vehicle in a backend (e.g., of a manufacturer of the transportation vehicle), i.e., a server, a server complex or a cloud. The transportation vehicle data stored therein can be accessed for analytical purposes (e.g., evaluation of driving behavior) or for providing a transportation vehicle-based service (e.g., navigation) by applications.

For a user of the transportation vehicle, the unmonitored collection of transportation vehicle data can sometimes result in an uneasy feeling, since he is not able to track who accesses the transportation vehicle data or to monitor how the transportation vehicle data are used in future. It is thus advisable to allow the user of the transportation vehicle to monitor the collected transportation vehicle data or to make data use transparent to the user.

The document US 2004/0128378 A1 shows a method for providing user data for third parties by a central data provider. The data can be input using an internet page of the data provider into a form that can be completely reset again by clicking on a reset button. However, the document US 2004/0128378 A1 does not show a solution for managing collected transportation vehicle data relating to a transportation vehicle as required.

The document US 2005/0229233 A1 shows a method for providing additional information when playing back a video. Settings made by a viewer of the video can be reset to standard values in this case using a reset button. However, the document US 2005/0229233 A1 also does not show a solution for managing collected transportation vehicle data relating to a transportation vehicle as required.

There is therefore a need to provide a way of managing collected transportation vehicle data relating to a transportation vehicle as required.

This is allowed by a method for managing collected transportation vehicle data relating to a transportation vehicle in a database. The database may be formed by a server, a server complex or a data cloud, for example. The transportation vehicle data collected in the database can comprise inter alia raw data measured in the transportation vehicle and also processed data (e.g., evaluated data). The transportation vehicle data may be user-specific, i.e., they may be associated with a specific user of the transportation vehicle. Alternatively, the transportation vehicle data may also be user-unspecific, i.e., although they are associated with a specific transportation vehicle, they are not associated with a specific user of the transportation vehicle. The transportation vehicle data can comprise recent destinations of the transportation vehicle, settings for the transportation vehicle (e.g., seat position, steering wheel position or mirror position), uses of the transportation vehicle (e.g., date, time, distance), telemetric data (e.g., engine speeds, speed profiles) or applications used in an infotainment system of the transportation vehicle, for example.

The transportation vehicle data are in this case stored in the database together with information about a permissible (permitted) use of the transportation vehicle data. In other words: together with the transportation vehicle data, rules about the permissible use of the transportation vehicle data are stored in the database. The database permits access to the transportation vehicle data only according to the information about the permissible use. Therefore, it is possible to ensure that access to the transportation vehicle data takes place only according to the information about the permissible use of the transportation vehicle data. The database may store not only the aforementioned information about the permissible use but also further information together with the transportation vehicle data. By way of example, user-specific transportation vehicle data may involve information about a user profile of the transportation vehicle user being stored.

The method in this case comprises receiving information about a desired manner of use of the transportation vehicle data. The information about the desired manner of use of the transportation vehicle data can be received as a result of a user input, for example. The user input can be made, e.g., in the transportation vehicle by pressing an operator control element or an input in the infotainment system of the transportation vehicle. It is also possible for the user input to be made, e.g., using an application on a mobile communication device (e.g., smartphone, tablet computer or laptop) or a computer. Additionally, the user input can also be made as a voice command for an infotainment system of the transportation vehicle or a mobile communication device. Alternatively, the information about the desired manner of use of the transportation vehicle data can be output automatically as a result of the occurrence of a predetermined condition. The information about the desired manner of use can be output, e.g., automatically after termination of a contractual relationship with an operator of the database (e.g., the manufacturer of the transportation vehicle); at a predetermined time; a registration with a new user profile in the transportation vehicle that is different than a previously used user profile; or an end of a journey. The information about the desired manner of use of the transportation vehicle data indicates the further manner of use of the collected transportation vehicle data that is desired (by a user). The desired manner of use may be diverse in this case. By way of example, it can range from a ban on the further use of the transportation vehicle data through limited use to complete data sharing. The desired manner of use can also comprise, e.g., a desired logging of the use of the transportation vehicle data.

Additionally, the method comprises updating the information about the permissible use of the transportation vehicle data according to the (received) information about the desired manner of use of the transportation vehicle data. When the information about the permissible use of the transportation vehicle data is updated, the previous information about the permissible use of the transportation vehicle data can be, e.g., overwritten. Alternatively, e.g., an access control unit of the database (e.g., a database management system managing the database) can be notified that the received information about the desired manner of use of the transportation vehicle data is now deemed the information about the permissible use of the transportation vehicle data. The updating of the information stored in the database about the permissible use of the transportation vehicle data means that it is possible to ensure that the database now only permits access to the stored transportation vehicle data according to the desired manner of use of the transportation vehicle data in future. A user can therefore specify a desired manner of use to decide about the future manner of use of the collected transportation vehicle data. In other words: the user can be provided with control over the transportation vehicle data.

According to some exemplary embodiments, the information about the desired manner of use of the transportation vehicle data indicates a ban on the further use of the transportation vehicle data. Accordingly, the information stored in the database about the permissible use of the transportation vehicle data is updated so that further use of the transportation vehicle data is not permissible. It is therefore possible to ensure that the transportation vehicle data stored in the database can no longer be accessed. Additionally, when there is a ban on the further use of the transportation vehicle data, the method further comprises erasing the transportation vehicle data from the database. By erasing the transportation vehicle data from the database, it is possible to ensure that physical access to the transportation vehicle data is no longer possible. A user can therefore be provided with a high level of certainty regarding the absence of further use of the transportation vehicle data.

In some exemplary embodiments, the transportation vehicle data are stored in the database together with information about access by applications to the transportation vehicle data. In other words: the database stores a log relating to the access to the transportation vehicle data. Information about access by applications to the transportation vehicle data can comprise, e.g., a name of the application, a network address of an apparatus on which the application is executed, a time of the access to the transportation vehicle data or else an operator of the application or of the apparatus on which the application is executed. Therefore, a wide range of information about the use of the transportation vehicle data can be kept. In the event of a ban on the further use of the transportation vehicle data, the method further comprises sending a request for erasure of local copies of the transportation vehicle data to an application that has accessed the transportation vehicle data according to the information about access by applications to the transportation vehicle data. In other words: the physical erasure of the transportation vehicle data is intended not just to be effected in the database, but also to comprise (external) local copies that has been produced by the accessing application. If a local copy of the transportation vehicle data has been produced by the application, the method thus comprises the application erasing the local copy of the transportation vehicle data. The application is therefore provided with an erasure request and ensures that local copies of the transportation vehicle data are erased. The erasure of the local copy of the transportation vehicle data by the application can be accomplished directly by the application itself in this case. However, the application can, e.g., also instruct a further (auxiliary) application to erase the local copy. By sending the erasure request to the application accessing the transportation vehicle data and erasing the local copy of the transportation vehicle data, it is possible to ensure that not only is further uses of the transportation vehicle data stored in the database prevented, but also further use of the transportation vehicle data as the local copy is prevented. Circumventing the desired ban on the further use of the transportation vehicle data by producing local copies (outside the database) can therefore be prevented.

According to some exemplary embodiments, the request for erasure of local copies of the transportation vehicle data is sent to all applications that have accessed the transportation vehicle data according to the information about access by applications to the transportation vehicle data. It is therefore possible to ensure that all local copies of the transportation vehicle data produced by the applications—as described above—are erased. Circumventing the desired ban on the further use of the transportation vehicle data by producing local copies (outside the database) can therefore be prevented.

In some exemplary embodiments, the request for erasure of local copies of the transportation vehicle data is sent as a result of the occurrence of a predetermined condition. The effect that can be achieved by this is that the occurrence of a predetermined condition automatically prompts the erasure request to be sent to further applications.

The condition may be, e.g., the termination of a contractual relationship with an operator of the database (e.g., the manufacturer of the transportation vehicle) or registration in the transportation vehicle with a user profile that is different than a previously used user profile or user profile coupled to the transportation vehicle (e.g., after sale of the transportation vehicle). In the case of the two aforementioned exemplary conditions, it can be assumed that a user of the transportation vehicle has no interest in further use of his previously collected transportation vehicle data by the operator of the database or another third party or in use of his transportation vehicle data to the benefit of the other user of the transportation vehicle. Rather, it can be assumed that the (previous) user of the transportation vehicle explicitly wants no further use of his transportation vehicle data. As a result of the automatic transmission of the erasure request, it can be ensured that this desire of the (previous) user of the transportation vehicle does not just translate into erasure of the transportation vehicle data from the database, but also (all) local copies are withdrawn from further use by applications. Since the erasure request is transmitted automatically, the user does not have to take action himself, which means that it is still possible for convenience for the user to be heightened.

According to some exemplary embodiments, the request for erasure of local copies of the transportation vehicle data further comprises a request to the application to forward the request for erasure of local copies of the transportation vehicle data to further applications that have accessed the local copy. Therefore, the request for erasure of local copies can be repetitively forwarded to all applications that had access to the transportation vehicle data (either directly or to local copies thereof). The erasure request can therefore be forwarded to all applications that have possibly produced local copies of the transportation vehicle data. Therefore, the desired ban on the further uses of the transportation vehicle data can also be implemented for these further applications.

In some exemplary embodiments, the method thus further comprises the application determining a further application that has accessed the local copy of the transportation vehicle data, and forwarding the request for erasure of local copies of the transportation vehicle data to the further application. In other words: the erasure request is forwarded to an application that has possibly produced local copies of the transportation vehicle data. If a further local copy of the transportation vehicle data has been produced by the further application, the method thus further comprises the further application erasing the further local copy of the transportation vehicle data. Thus, the desired ban on the further uses of the transportation vehicle data is also implemented for the further application.

According to some exemplary embodiments, the method further comprises outputting a notification to a user of the transportation vehicle that the transportation vehicle data have been erased. A user can therefore be actively notified that his ban on the further use of the transportation vehicle data has been complied with. The notification can be output to the user, e.g., in text form or as a voice output via the infotainment system of the transportation vehicle or by an application on a mobile communication device. If, besides the transportation vehicle data, local copies of the transportation vehicle data have also been erased from the database, the notification can optionally comprise further information concerning the erased local copies. As such, the notification can comprise a name of the application producing (or managing) the local copy, a network address of an apparatus on which the application is executed, or else an operator of the application or of the apparatus on which the application is executed, for example. The user of the transportation vehicle can therefore be comprehensively informed about the spread of the transportation vehicle data. The user can therefore be provided with a high level of transparency regarding the data use.

In some exemplary embodiments, the information about the desired manner of use of the transportation vehicle data indicates at least one application that is exclusively permitted to access the transportation vehicle data. The information can indicate, e.g., specifically an application, such as a particular navigation application or a particular service application of a manufacturer of the transportation vehicle, for example. Alternatively, the information about the desired manner of use can also indicate one or more application categories, such as navigation applications or transportation vehicle analysis applications, for example. It is also possible for the information about the desired manner of use to indicate, e.g., that applications of a particular manufacturer or operator are exclusively permitted to access the transportation vehicle data. The applicable updating of the information stored in the database about the permissible use of the transportation vehicle data allows access to the transportation vehicle data to be regulated according to the desires of a user of the transportation vehicle. Therefore, a user can explicitly specify who is permitted to access his transportation vehicle data. Use of the transportation vehicle data that the user does not want can therefore be prevented. Optionally, the information about the desired manner of use of the transportation vehicle data can contain further restrictions regarding the transportation vehicle data. By way of example, these can indicate that the creation of local copies of the transportation vehicle data is prohibited. Therefore, user wishes regarding data use can be implemented as required.

According to some exemplary embodiments, the information about the desired manner of use of the transportation vehicle data indicates a predetermined validity of the transportation vehicle data. The validity of the data in this case indicates that the transportation vehicle data are legally permitted to be used only within predetermined limits. Therefore, user wishes regarding data use can again be implemented as required.

In some exemplary embodiments, the predetermined validity of the transportation vehicle data comprises a period of validity of the transportation vehicle data and/or a local validity of the transportation vehicle data and/or a maximum number of aggregations of subsets of the transportation vehicle data. Definition of a period of validity of the transportation vehicle data (or of a subset thereof) allows a period of usability of the transportation vehicle data to be limited. As such, it is possible, e.g., to specify that the transportation vehicle data can be accessed only within a certain period after they are captured and stored in the database. Besides user wishes, this also makes it possible to ensure, e.g., that applications can only access current transportation vehicle data. Definition of a local validity of the transportation vehicle data (or of a subset thereof) allows the area of usability of the transportation vehicle data to be limited. As such, it is possible, e.g., to specify that the data are allowed to be accessed only by applications or apparatus in a particular network domain. In this way, the data can be protected against access by unauthorized third parties. Definition of a maximum number of aggregations of subsets of the transportation vehicle data allows, e.g., an analysis of the transportation vehicle data to be restricted. A user can therefore limit an accumulation of subsets of the transportation vehicle data, so that applications can only access subsets of the transportation vehicle data that are stipulated by the user.

According to some exemplary embodiments, the information about the desired manner of use of the transportation vehicle data indicates a ban on access by an application of a third party other than an operator of the database to the transportation vehicle data. It is therefore possible to ensure that only the operator of the database can access the transportation vehicle data, but no third parties. If the database is operated by a manufacturer of the transportation vehicle, it is possible to ensure that no other third parties have access to the transportation vehicle data in the database. A user can therefore permit the transportation vehicle manufacturer to access the transportation vehicle data to be able to use service applications of the transportation vehicle manufacturer (e.g., navigation, prediction regarding wear of transportation vehicle parts) without needing to be afraid of the data being forwarded to third parties. A user can therefore ensure that only the operator of the database with whom he has arranged the collection of the transportation vehicle data can access the data.

As already indicated above, the desired manner of use of the transportation vehicle data in some exemplary embodiments comprises logging access by an application to the transportation vehicle data. A user of the transportation vehicle can thus convey, e.g., his desire for transparency regarding data use to the operator of the database. Accordingly, the method then additionally comprises logging the access by an application to the transportation vehicle data. The logged access can comprise, e.g., information about a name of the accessing application, a network address of an apparatus on which the application is executed, a time of access to the transportation vehicle data or else an operator of the application or of the apparatus on which the application is executed. Therefore, information about the use of the transportation vehicle data can be kept.

According to some exemplary embodiments, the method further comprises sending a query to the application concerning whether the application has allowed a further application to access the transportation vehicle data. It is therefore possible to check whether the application had indirectly provided further applications with access to the transportation vehicle data. If the application has allowed the further application to access the transportation vehicle data, the method additionally comprises logging the access by the further application to the transportation vehicle data. Therefore, further information about the use of the transportation vehicle data can be kept. Besides the trackability of the use of the data, it is in this way, e.g., also possible to establish whether applications that are not actually permitted to access the transportation vehicle data in fact had access to the transportation vehicle data via the further application. It is therefore possible to keep a comprehensive overview of the data use. The logged access can again comprise, e.g., information about a name of the accessing application, a network address of an apparatus on which the application is executed, a time of the access to the transportation vehicle data or else an operator of the application or of the apparatus on which the application is executed.

In some exemplary embodiments, the method further comprises receiving a user input by a user of the transportation vehicle, wherein the user input indicates a desired output of logged access to the user. A user can therefore check the use of his data. The user input can again be made, e.g., in the transportation vehicle by pressing an operator control element or an input in the infotainment system of the transportation vehicle. It is also possible for the user input to be made, e.g., using an application on a mobile communication device or a computer. Additionally, the user input can also be made as a voice command for an infotainment system of the transportation vehicle or a mobile communication device. The method thus further comprises outputting the logged access to the user. The output can be output to the user, e.g., in text form or as a voice output via the infotainment system of the transportation vehicle or using an application on a mobile communication device. The user can therefore be provided with the desired information about the uses of the transportation vehicle data. The user can thus obtain an overview of the use of his data, so that the user can be provided with a high level of transparency for the data use.

As already indicated above, the information about the desired manner of use of the transportation vehicle data is based, according to some exemplary embodiments, on a user input by a user of the transportation vehicle. The user can therefore actively decide about the permissible use of the collected transportation vehicle data. The user therefore has complete control over the collected transportation vehicle data.

The above-described functionality can in this case run on a new additional hardware component of the database, such as a CPU (central processing unit) or the like. It goes without saying that, according to some exemplary embodiments, the functionality does not have to be implemented by an additional hardware subassembly such as a further processor or the like. According to some exemplary embodiments, it is also possible for the functionality to be implemented by a simple software update for an already existing CPU or an already existing programmable hardware component. By way of example, an already existing database management system can be updated to provide the above-described functionality. Thus, exemplary embodiments also comprise a program having a program code for performing the above-described method when the program code runs or is executed on a computer, a processor or a programmable hardware component.

FIG. 1 shows a method 100 for managing collected transportation vehicle data relating to a transportation vehicle in a database (e.g., server, server complex or data cloud). The transportation vehicle data in this case are stored in the database together with information about a permissible (permitted) use of the transportation vehicle data. The database permits access to the transportation vehicle data only according to the information about the permissible use. It is therefore possible to ensure that the transportation vehicle data are accessed only according to the information about the permissible use of the transportation vehicle data.

The method 100 in this case comprises receiving 102 information about a desired manner of use of the transportation vehicle data. The information about the desired manner of use of the transportation vehicle data can be received as a result of a user input, for example. Alternatively, the information about the desired manner of use of the transportation vehicle data can be automatically output as a result of the occurrence of a predetermined condition. The information about the desired manner of use of the transportation vehicle data indicates the further manner of use of the collected transportation vehicle data that is desired (by a user). The desired manner of use may be diverse in this case. By way of example, it can range from a ban on the further use of the transportation vehicle data through limited use to complete data sharing. The desired manner of use can also comprise, e.g., a desired logging of the use of the transportation vehicle data.

Additionally, the method 100 comprises updating 104 the information about the permissible use of the transportation vehicle data according to the (received) information about the desired manner of use of the transportation vehicle data. When the information about the permissible use of the transportation vehicle data is updated, the previous information about the permissible use of the transportation vehicle data can be, e.g., overwritten. Alternatively, e.g., an access control unit of the database (e.g., a database management system managing the database) can be notified that the received information about the desired manner of use of the transportation vehicle data is now deemed the information about the permissible use of the transportation vehicle data.

The updating of the information stored in the database about the permissible use of the transportation vehicle data means that it is possible to ensure that the database now only permits access to the stored transportation vehicle data according to the desired manner of use of the transportation vehicle data in future. A user can therefore specify a desired manner of use to decide about the future manner of use of the collected transportation vehicle data. In other words: the user can be provided with control over the transportation vehicle data.

Further details and properties of the method are described above in connection with one or more exemplary embodiments. The method can comprise one or more optional features according to one or more of the above-described exemplary embodiments.

Figure 2:
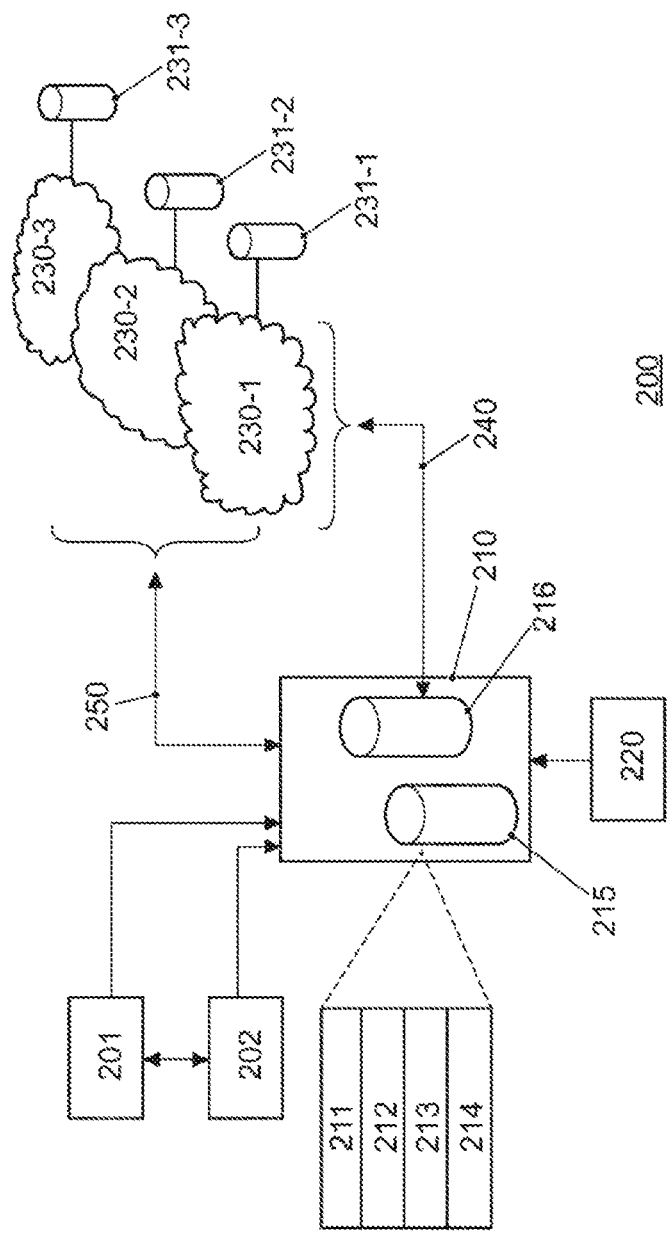
FIG. 2 schematically shows an example of a system for collecting and using transportation vehicle data.

FIG. 2 shows an overview of an exemplary system 200 that collects transportation vehicle data 211 and processes them further. The transportation vehicle data 211 are collected from a transportation vehicle 201 and stored in a database 210. If the transportation vehicle 201 has been personalized using a user profile 202, the transportation vehicle data 211 may be stored in a personalized manner in the database. To this end, user information 213 corresponding to the user profile 202 may be stored besides the transportation vehicle data 211.

As FIG. 2 shows, the database 210 can comprise a first server 215 and a second server 216, which may be arranged either in physical proximity to one another (e.g., in a common server park) or remotely from one another (e.g., in different server parks). The database 210 may quite generally be built up from one or more servers to provide a data cloud.

The transportation vehicle data 211 (and optionally the user information 213) are stored in the database 210 together with information 212 about a permissible use of the transportation vehicle data. The data (or just portions thereof) may be available in the database 210 either in an unencrypted manner or in an encrypted manner. In view of data security, however, encryption of the data may be beneficial. Similarly, the transportation vehicle data 211 can also already be transmitted from the transportation vehicle 201 to the database 210 in an encrypted manner. The database 210 permits access to the transportation vehicle data 211 only according to the information 212 about the permissible use.

The database 210 (e.g., an internal database management system) is in this case configured to receive information 220 about a desired manner of use of the transportation vehicle data and to update the information 212 about the permissible use of the transportation vehicle data according to the received information 220 about the desired manner of use of the transportation vehicle data. Alternatively, the above-described functionality can also be undertaken by an external control module (not shown) that controls and pilots the database 210. The control module may in this case be configured either as a hardware component or as a software component.

The access by applications 230-1, 230-2, 230-3 to the transportation vehicle data 211 is restricted by the database 210 according to the information 212 about the permissible use of the transportation vehicle data. If, e.g., the information 212 about the permissible use of the transportation vehicle data indicates a ban on the further use of the transportation vehicle data 211, the database 210 does not permit the applications 230-1, 230-2, 230-3 to access the transportation vehicle data 211 (and optionally also the user information 213) via the connection 240 any longer. If, by way of example, the information 212 about the permissible use of the transportation vehicle data indicates exclusive permission to access the transportation vehicle data 211 for the first application 230-1, the database 210 permits the first application 230-1 to access the transportation vehicle data 211 via the connection 240, but does not permit this for the second application 230-2 and the third application 230-3.

Additionally, the information 212 about the permissible use of the transportation vehicle data can comprise logging access by an application to the transportation vehicle data. In that case, access by one of the applications 230-1, 230-2, 230-3 to the transportation vehicle data 211 is logged by the database 211. That is to say that additionally information 214 about access by applications to the transportation vehicle data is stored in the database 210. Additionally, a query connection 250 can be used to actively send a query to one of the applications 230-1, 230-2, 230-3 concerning whether the application has allowed a further application to access the transportation vehicle data 211. If, e.g., the first application 230-1 has now permitted the second application 230-2 to access the transportation vehicle data 211 (e.g., by forwarding the transportation vehicle data or by allowing the first application 230-1 to access a local copy of the transportation vehicle data), the first application 230-1 communicates this via the query connection 250, so that the access by the second application 230-2 to the transportation vehicle data 211 can be logged. It is therefore possible to comprehensively track how the transportation vehicle data 211 has been used.

The information 212 about the permissible use of the transportation vehicle data can also indicate a ban on the further use of the transportation vehicle data 211, for example. Accordingly, the transportation vehicle data 211 are erased from the database 210 to ensure that physical access to the transportation vehicle data 211 is no longer possible. As already indicated above, the applications 230-1, 230-2, 230-3 can also produce local copies of the transportation vehicle data 211. By way of example, the applications 230-1, 230-2, 230-3 can store local copies of the transportation vehicle data 211 in respective memories 231-1, 231-2, 231-3. To also rule out the further uses of these local copies of the transportation vehicle data 211, requests for erasure of local copies of the transportation vehicle data 211 are sent to the applications 230-1, 230-2, 230-3 if the applications have accessed the transportation vehicle data 211 according to the information 214 about access by applications to the transportation vehicle data. If a local copy of the transportation vehicle data 211 has been produced by one of the applications 230-1, 230-2, 230-3, the local copy of the transportation vehicle data 211 is erased by the application 230-1, 230-2 or 230-3 from its respective memory 231-1, 231-2, 231-3.

If only one of the applications 230-1, 230-2, 230-3, e.g., the first application 230-1, has directly accessed the transportation vehicle data 211 in the database 210 and has produced a local copy of the transportation vehicle data 211 in its memory 231-1, but permits a further application, e.g., the second application 230-2, to access this local copy, then the request for erasure can also ensure that the second application 230-2 also cannot use the transportation vehicle data 211 further. To this end, request for erasure of local copies of the transportation vehicle data comprises a request to the first application 230-1 to forward the request for erasure of local copies of the transportation vehicle data to applications that have accessed their local copy of the transportation vehicle data 211. Accordingly, the first application 230-1 checks whether it has permitted a further application to access its local copy. In the present example, the first application would determine that the second application 230-2 has accessed its local copy of the transportation vehicle data 211. The first application 230-1 then forwards the request for erasure of local copies of the transportation vehicle data 211 to the second application 230-2. If the second application 230-2 has stored a further local copy of the transportation vehicle data 211 in its memory 231-2, it erases it. The forwarding of the request for erasure of local copies of the transportation vehicle data is carried out repetitively, so that they all applications that have demonstrably accessed the transportation vehicle data 211 are sent the erasure request and all local copies of the transportation vehicle data 211 can be erased.

In this manner, undesirable further use of the transportation vehicle data 211 can be prevented. Confirmation of the erasure of the transportation vehicle data 211 can be output by a notification, e.g., to a user of the transportation vehicle.

Figure 3:
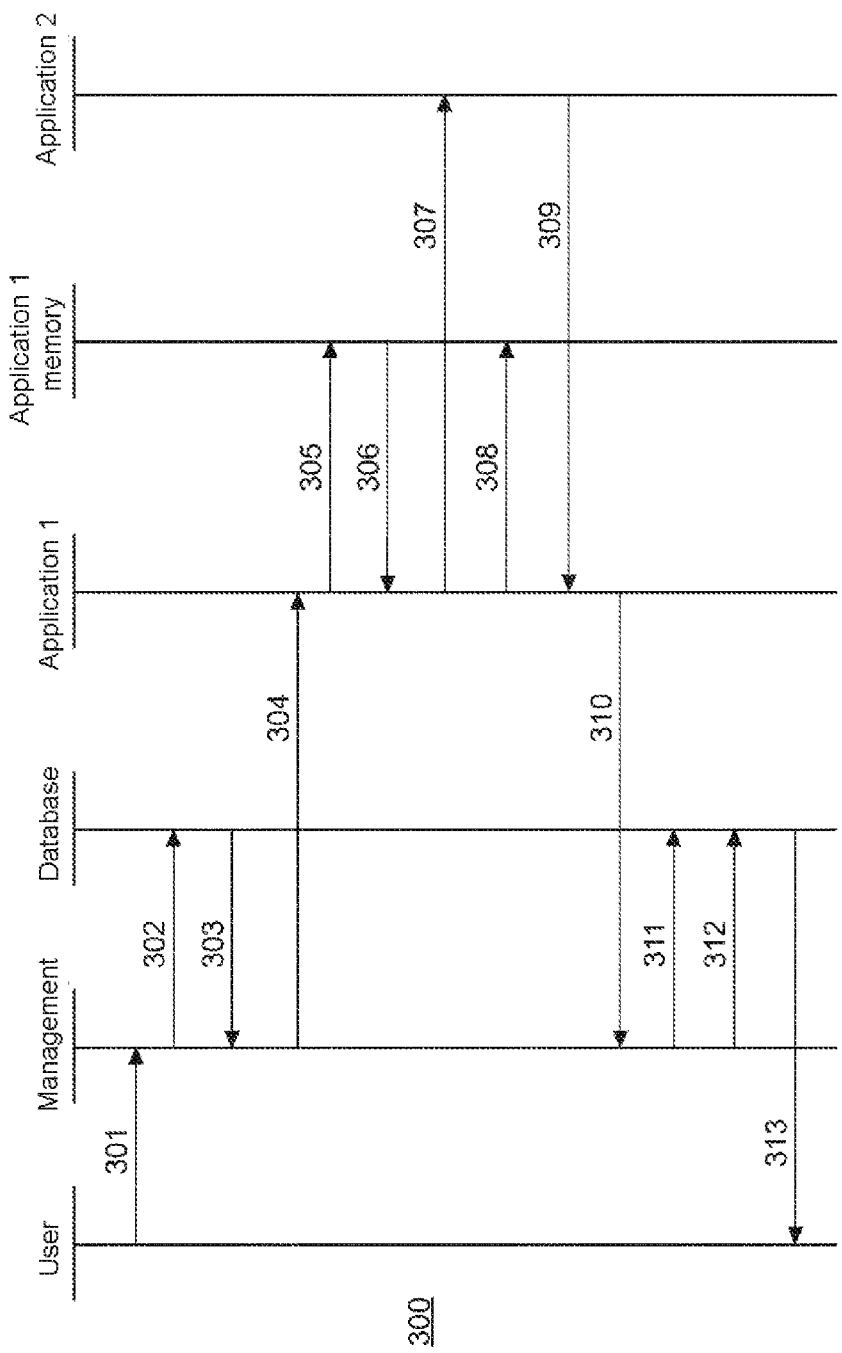
FIG. 3 schematically shows a flowchart for an exemplary embodiment of an erasure of transportation vehicle data.

To clarify the erasure process, FIG. 3 schematically shows a flowchart 300 for an exemplary embodiment of an erasure of transportation vehicle data.

A user makes a user input 301 (e.g., in the transportation vehicle or an application on a mobile communication device or computer) that is received by a management module of the database. The user input specifies that further use of the transportation vehicle data is not desired. Accordingly, the information about the permissible use of the transportation vehicle data in the database is updated 302. Additionally, the database transmits 303 information about access by applications to the transportation vehicle data to the management module. The management module evaluates the information about access by applications to the transportation vehicle data and sends 304 a request for erasure of local copies of the transportation vehicle data to an application 1 specified in the information about access by applications to the transportation vehicle data.

The application 1 has stored a local copy of the transportation vehicle data in its memory. The application 1 first of all updates 305 its information about the permissible use of the transportation vehicle data and receives 306 from its memory information about access by applications to its local copy of the transportation vehicle data. The application 1 evaluates the information about access by applications to the local copy of the transportation vehicle data and sends 307 a request for erasure of local copies of the transportation vehicle data to an application 2 specified in the information about access by applications to the local copy of the transportation vehicle data. Further, the application 1 erases 308 the local copy of the transportation vehicle data. If the application 2 has created a further local copy of the transportation vehicle data, this copy is erased by the application 2 and confirmation of the erasure of the transportation vehicle data is sent 309 to the application 1.

The application 1 in turn sends 310 confirmation to the management module confirming that the application and the application 2 have erased their local copies of the transportation vehicle data. The management module in turn prompts 311 an erasure of the transportation vehicle data from the database. The erasures of the transportation vehicle data are logged 312 in the database and output 313 to the user. The user is therefore provided with direct feedback about the successful execution of his user input. The user can, as shown in the exemplary embodiment, control the use of the transportation vehicle data fully comprehensively.

LIST OF REFERENCE SIGNS

100 Method for managing collected transportation vehicle data
102 Receive information about a desired manner of use
104 Update the information about the permissible use
200 System
201 Transportation vehicle
202 User profile
210 Database
211 Transportation vehicle data
212 Information about the permissible use
213 User information
214 Information about access by applications to the transportation vehicle data
215 First server
216 Second server
220 Information about a desired manner of use
230-1 First application
230-2 Second application
230-3 Third application
231-1 First memory
231-2 Second memory
231-3 Third memory
240 Connection
250 Query connection
300 Flowchart
301 User input
302 Update the information about the permissible use of the transportation vehicle data
303 Transmit information about access by applications to the transportation vehicle data
304 Send a request for erasure of local copies of the transportation vehicle data
305 Update the information about the permissible use of the transportation vehicle data
306 Send information about access by applications to the transportation vehicle data
307 Send a request for erasure of local copies of the transportation vehicle data
308 Erase the local copy of the transportation vehicle data
309 Send confirmation of the erasure
310 Send confirmation of the erasure
311 Erase the transportation vehicle data
312 Log the erasure of the transportation vehicle data
313 Output the erasure of the transportation vehicle data to the user

The invention claimed is:

1. A method for managing collected transportation vehicle data relating to a transportation vehicle in a database, wherein the transportation vehicle data are stored in the database together with information about a permissible use of the transportation vehicle data, and wherein the database permits access to the transportation vehicle data only according to the information about the permissible use, the method comprising:
receiving information about a desired use of the transportation vehicle data, the transportation vehicle data comprising data measured in operation of the transportation vehicle, wherein the information about the desired manner of use of the vehicle data indicates a ban of further use of the vehicle data;
updating the information about the permissible use of the transportation vehicle data according to the information about the desired use of the transportation vehicle data;
erasing the measured transportation vehicle data from the database, wherein the transportation vehicle data are stored in the database together with a log of access, wherein the log includes the name of each application and time of access by applications to the measured transportation vehicle data; and
sending a request for erasure of local copies of the measured transportation vehicle data to applications in response to a determination that the applications have accessed the measured transportation vehicle data based on the log of access by applications to the measured transportation vehicle data.

2. The method of claim 1, wherein the transportation vehicle data are stored in the database together with information about access by applications to the transportation vehicle data, and wherein the method further comprises erasing by the application the local copy of the transportation vehicle data in response to a local copy of the transportation vehicle data being produced by the application.

3. The method of claim 2, wherein the request for erasure of local copies of the transportation vehicle data is sent to all applications that have accessed the transportation vehicle data according to the log about access by applications to the transportation vehicle data.

4. The method of claim 2, wherein the request for erasure of local copies of the transportation vehicle data further comprises a request to the application to forward the request for erasure of local copies of the transportation vehicle data to further applications that have accessed the local copy.

5. The method of claim 4, further comprising:
determining by the application a further application that has accessed the local copy of the transportation vehicle data;
forwarding the request for erasure of local copies of the transportation vehicle data to the further application; and
erasing by the further application the further local copy of the transportation vehicle data in response to a further local copy of the transportation vehicle data having been produced by the further application.

6. The method of claim 1, further comprising outputting a notification to a user of the transportation vehicle that the transportation vehicle data have been erased.

7. The method of claim 1, wherein the information about the desired use of the transportation vehicle data indicates at least one application that is exclusively permitted to access the transportation vehicle data.

8. The method of claim 1, wherein the information about the desired use of the transportation vehicle data indicates a predetermined validity of the transportation vehicle data.

9. The method of claim 8, wherein the predetermined validity of the transportation vehicle data comprises a period of validity of the transportation vehicle data and/or a local validity of the transportation vehicle data and/or a maximum number of aggregations of subsets of the transportation vehicle data.

10. The method of claim 1, wherein the information about the desired use of the transportation vehicle data indicates a ban on access by an application of a third party other than an operator of the database to the transportation vehicle data.

11. The method of claim 1, wherein the desired use of the transportation vehicle data comprises logging access by an application to the transportation vehicle data, and wherein the method further comprises logging the access by an application to the transportation vehicle data.

12. The method of claim 11, further comprising:
sending a query to the application concerning whether the application has allowed a further application to access the transportation vehicle data; and
logging the access by the further application to the transportation vehicle data in response to the application allowing the further application to access the transportation vehicle data.

13. The method of claim 12, wherein further comprising:
receiving a user input by a user of the transportation vehicle, wherein the user input indicates a desired output of logged access to the user; and
outputting the logged access to the user.

14. The method of claim 1, wherein the information about the desired use of the transportation vehicle data is based on a user input by a user of the transportation vehicle.

15. The method of claim 1, wherein the data measured in operation of the transportation vehicle comprises transportation vehicle user data.

16. The method of claim 1, wherein the data measured in operation of the transportation vehicle comprises uses of the transportation vehicle, including date, time and distance traveled.

17. The method of claim 1, wherein the information about access by applications further comprises a network address of an apparatus on which the application is executed, a time of access to the transportation vehicle data.

* * * * *